US008629820B2

(12) United States Patent
Do et al.

(10) Patent No.: US 8,629,820 B2
(45) **Date of Patent: *Jan. 14, 2014**

(54) LIQUID CRYSTAL DISPLAY AND DRIVING METHOD THEREOF

(75) Inventors: Hee-Wook Do, Suwon-si (KR); Ji-Won Sohn, Seoul (KR); Nak-Cho Choi, Seoul (KR); Jiangang Lu, Yongin-si (KR); Hak-Sun Chang, Yongin-si (KR); Chang-Hun Lee, Yongin-si (KR)

(73) Assignee: Samsung Display Co., Ltd. (KR)

( * ) Notice: Subject to any disclaimer, the term of this patent is extended or adjusted under 35 U.S.C. 154(b) by 39 days.

This patent is subject to a terminal disclaimer.

(21) Appl. No.: 12/880,664

(22) Filed: Sep. 13, 2010

(65) Prior Publication Data

US 2011/0007059 A1 Jan. 13, 2011

Related U.S. Application Data

(63) Continuation of application No. 11/349,505, filed on Feb. 7, 2006, now Pat. No. 7,817,123.

(30) Foreign Application Priority Data

Feb. 7, 2005 (KR) ........................ 10-2005-0011214

(51) Int. Cl.
*G06F 3/038* (2013.01)

(52) U.S. Cl.
USPC ............................................ 345/87; 345/204

(58) Field of Classification Search
USPC .................................................... 345/87, 204
See application file for complete search history.

(56) References Cited

U.S. PATENT DOCUMENTS

| | | | | |
|---|---|---|---|---|
| 5,926,162 | A | 7/1999 | Wood | |
| 5,945,970 | A * | 8/1999 | Moon et al. | 345/92 |
| 6,304,239 | B1 * | 10/2001 | McKnight | 345/87 |
| 6,329,976 | B1 | 12/2001 | Johnson | |
| 6,710,372 | B2 | 3/2004 | Kim | |
| 6,762,565 | B2 | 7/2004 | Kudo et al. | |
| 6,778,163 | B2 * | 8/2004 | Ozawa | 345/96 |

(Continued)

FOREIGN PATENT DOCUMENTS

| | | |
|---|---|---|
| JP | 05249499 | 9/1993 |
| JP | 06067148 | 3/1994 |

(Continued)

*Primary Examiner* — Bipin Shalwala
*Assistant Examiner* — Afroza Chowdhury
(74) *Attorney, Agent, or Firm* — Cantor Colburn LLP

(57) ABSTRACT

A liquid crystal display ("LCD") includes a plurality of gate lines, a plurality of data lines intersecting the gate lines, a plurality of switching elements connected to the gate lines and the data lines, a plurality of storage electrodes, a plurality of storage electrode lines connected to the storage electrodes, a plurality of pixel electrodes connected to the switching elements and overlapping the storage electrodes, a gate driver generating gate signals having a gate-on voltage and a gate-off voltage to apply to the gate lines, a data driver generating data voltages corresponding to externally applied image signals to apply to the data lines, and a storage electrode driver generating storage electrode signals having a reference voltage, a high voltage larger than the reference voltage, and a low voltage smaller than the reference voltage to apply to the storage electrode lines. Each storage electrode signal changes a level thereof when the gate-on voltage is applied to the gate lines and changes a level thereof when a predetermined time elapses after the gate-off voltage is applied to the gate lines.

20 Claims, 13 Drawing Sheets

(56) References Cited

U.S. PATENT DOCUMENTS

| | | | | |
|---|---|---|---|---|
| 6,873,378 | B2 * | 3/2005 | Kai | 349/38 |
| 6,897,845 | B2 * | 5/2005 | Ozawa | 345/94 |
| 6,909,415 | B2 * | 6/2005 | Kumagawa et al. | 345/92 |
| 7,019,725 | B1 | 3/2006 | Lee et al. | |
| 7,068,330 | B2 | 6/2006 | Song et al. | |
| 7,109,984 | B2 | 9/2006 | Moon | |
| 7,184,011 | B2 * | 2/2007 | Lee et al. | 345/99 |
| 7,342,562 | B2 | 3/2008 | Kawase et al. | |
| 7,446,763 | B2 | 11/2008 | Kim | |
| 7,486,367 | B2 * | 2/2009 | You | 349/149 |
| 7,705,819 | B2 * | 4/2010 | Choi et al. | 345/98 |
| 7,777,854 | B2 * | 8/2010 | Moon | 349/149 |
| 7,817,122 | B2 * | 10/2010 | Jang et al. | 345/87 |
| 7,872,697 | B2 * | 1/2011 | Shin | 349/42 |
| 2001/0011981 | A1 | 8/2001 | Yamamoto et al. | |
| 2002/0084969 | A1 * | 7/2002 | Ozawa | 345/96 |
| 2002/0084970 | A1 * | 7/2002 | Ozawa | 345/96 |
| 2002/0118154 | A1 * | 8/2002 | Kim | 345/87 |
| 2003/0128306 | A1 * | 7/2003 | Kai | 349/39 |
| 2004/0095342 | A1 * | 5/2004 | Lee et al. | 345/211 |
| 2004/0119925 | A1 * | 6/2004 | Moon | 349/139 |
| 2004/0160405 | A1 | 8/2004 | Lin | |
| 2004/0173797 | A1 | 9/2004 | Kim | |
| 2004/0233343 | A1 | 11/2004 | Baek | |
| 2004/0263446 | A1 | 12/2004 | Kawase et al. | |
| 2005/0052396 | A1 | 3/2005 | Kim | |
| 2005/0098785 | A1 * | 5/2005 | You | 257/72 |
| 2005/0242351 | A1 | 11/2005 | Kim | |
| 2007/0002194 | A1 * | 1/2007 | Shin | 349/38 |
| 2008/0062104 | A1 | 3/2008 | Lee | |
| 2010/0014014 | A1 | 1/2010 | Kim | |

FOREIGN PATENT DOCUMENTS

| | | |
|---|---|---|
| JP | 07306662 | 11/1995 |
| JP | 07318899 | 12/1995 |
| JP | 08184854 | 7/1996 |
| JP | 2000231091 | 8/2000 |
| JP | 2001265287 | 9/2001 |
| JP | 2002358051 | 12/2002 |
| JP | 2004246312 | 9/2004 |
| KR | 1020010093773 | 10/2001 |
| KR | 100338012 | 5/2002 |
| KR | 1020020044673 | 6/2002 |
| KR | 1020030046918 | 6/2003 |
| KR | 1020040059067 | 7/2004 |

* cited by examiner

LIQUID CRYSTAL DISPLAY AND DRIVING METHOD THEREOF

CROSS REFERENCE TO RELATED APPLICATIONS

This application is a Continuation Application of U.S. patent application Ser. No. 11/349,505, filed Feb. 7, 2006; which claims priority to Korean Patent Application No. 10-2005-0011214, filed on Feb. 7, 2005, the contents of which in their entirety are herein incorporated by reference.

BACKGROUND OF THE INVENTION (a) Field of the Invention

The present invention relates to a liquid crystal display ("LCD") and a driving method thereof. More particularly, the present invention relates to an LCD having an improved response speed of liquid crystal ("LC") molecules therein, and a driving method of the LCD.

(b) Description of Related Art

A liquid crystal display ("LCD") is one of the most widely used flat panel displays. An LCD includes two opposed panels provided with field-generating electrodes such as pixel electrodes and a common electrode, and a liquid crystal ("LC") layer interposed between the two panels. The LCD displays images by applying voltages to the field-generating electrodes to generate an electric field in the LC layer, which determines orientations of LC molecules in the LC layer to adjust polarization of incident light.

Among the LCDs, a vertical alignment ("VA") mode LCD, which aligns LC molecules such that the long axes of the LC molecules are perpendicular to the panels in the absence of an electric field, is often employed because of its high contrast ratio and wide reference viewing angle, which is defined as a viewing angle making a contrast ratio equal to 1:10 or as a limit angle for the inversion of luminance between the grays.

The wide viewing angle of the VA mode LCD can be realized by cutouts and/or protrusions on the field-generating electrodes. Since the cutouts and the protrusions can determine the tilt directions of the LC molecules, the tilt directions can be distributed into several directions by using the cutouts and the protrusions such that the reference viewing angle is widened. A patterned vertically aligned ("PVA") mode LCD using the cutouts may substitute an in-plane switching ("IPS") mode LCD, and is thereby recognized as a wide viewing angle technology.

Meanwhile, the LCD is widely used for television sets as well as for display devices for computers, and it is necessary to display a moving image. However, since the response speed of the LC molecules is slow, it is difficult for the LCD to display the moving image.

Due to the slow response speed of the LC molecules, until a voltage charged in an LC capacitor reaches a target voltage, that is, a voltage capable of obtaining a desired luminance, an amount of time is required. The amount of time is varied based on the previous charged voltage of the LC capacitor. Thus, when a difference between the target voltage and the previous charged voltage is large, the voltage charged in the LC capacitor does not reach the target voltage for one frame after application of a data voltage corresponding to the target voltage.

Thus, to shorten the time for reaching the target voltage, a dynamic capacitance compensation ("DCC") method has been proposed. The DCC method uses the fact that the response speed of the LC molecules increases as a voltage applied across both ends of the LC capacitor becomes larger.

A data voltage applied to a corresponding pixel (although a difference exists between the data voltage and the common voltage, for convenience the common voltage is assumed as "0"), which is higher than a target voltage is applied, to shorten the time for reaching the target voltage.

However, to use the DCC method, a frame memory is necessary for storing image signals for one or two frame, and thereby the manufacturing cost is increased.

BRIEF SUMMARY OF THE INVENTION

The present invention is thus proposed to solve the problems of conventional techniques.

In exemplary embodiments of the present invention, a liquid crystal display ("LCD") is provided, which includes a plurality of gate lines, a plurality of data lines intersecting the gate lines, a plurality of switching elements connected to the gate lines and the data lines, a plurality of storage electrodes, a plurality of storage electrode lines connected to the storage electrodes, a plurality of pixel electrodes connected to the switching elements and overlapping the storage electrodes, a gate driver generating gate signals having a gate-on voltage and a gate-off voltage to apply to the gate lines, a data driver generating data voltages corresponding to externally applied image signals to apply to the data lines, and a storage electrode driver generating storage electrode signals having a reference voltage, a high voltage larger than the reference voltage, and a low voltage smaller than the reference voltage to apply to the storage electrode lines, wherein each storage electrode signal changes a level thereof when a gate-on voltage is applied to the gate lines and changes a level thereof when a predetermined time elapses after the gate-off voltage is applied to the gate lines and prior to an end of a frame.

When a polarity of a data voltage is changed from negative to positive, each storage electrode signal may be changed from the reference voltage into the low voltage when the gate-on voltage is applied, and the storage electrode signal may be changed from the low voltage into the reference voltage when the predetermined time has elapsed after the gate-off voltage is applied to the gate lines.

When a polarity of the data voltage is changed from positive to negative, the storage electrode signal may be changed from the reference voltage into the high voltage when the gate-on voltage is applied, and the storage electrode signal may be changed from the low voltage into the reference voltage after the predetermined time has elapsed after the gate-off voltage is applied to the gate lines.

The reference voltage may be equal to a common voltage applied to a common electrode facing the pixel electrodes, and the polarity of the data voltages may be dot-reversed.

The storage electrodes of one pixel row may be alternatingly connected to two adjacent storage electrode lines, and the storage electrode lines and the gate lines may be alternatingly disposed and storage electrode lines on first sides of the gate lines may be connected to storage electrodes on opposite second sides of the gate lines through at least one connection bridge.

Each storage electrode line may include a plurality of transverse portions alternately disposed on upper and lower parts of a corresponding data line, and the transverse portions are connected to each other through at least one connection bridge.

Each pixel electrode may be partitioned into a plurality of portions, and each pixel electrode may include a plurality of cutouts or protrusions defining the plurality of portions.

When a polarity of the data voltage is changed from negative polarity into positive polarity, the storage electrode signal may be changed from the reference voltage into the high voltage when a gate-on voltage is applied, and the storage electrode signal may be changed from the high voltage into the reference voltage after of the predetermined time has elapsed after the gate-off voltage is applied to the gate lines.

When a polarity of the data voltage is changed from positive to negative, the storage electrode signal may be changed from the reference voltage into the low voltage when a gate-on voltage is applied, and the storage electrode signal may be changed from the low voltage into the reference voltage after the predetermined time has elapsed after the gate-off voltage is applied to the gate lines.

The liquid crystal display may further include a liquid crystal layer having liquid crystal molecules, wherein a pixel voltage is changed at a time when the predetermined time elapses after the gate-off voltage is applied to the gate lines to improve response speed of the liquid crystal molecules. In these embodiments, the pixel voltage may be changed without employment of a frame memory.

In further exemplary embodiments of the present invention, a driving method of a liquid crystal display is provided, which includes applying a gate-on voltage, applying a data voltage when the gate-on voltage is applied, firstly converting a level of a storage electrode signal, having one of a reference voltage, a high voltage larger than the reference voltage, and a low voltage smaller than the reference voltage, simultaneously with application of the gate-on voltage, applying a gate-off voltage, and secondly converting the level of the storage electrode signal at a time when a predetermined time is elapsed after application of the gate-off voltage.

Firstly converting a level of a storage electrode signal may include converting the storage electrode signal from the reference voltage into the low voltage when polarity of the data voltage is changed from negative polarity into positive polarity, and converting the storage electrode signal from the reference voltage into the high voltage when polarity of the data voltage is changed from positive polarity into negative polarity.

Secondly converting the level of the storage electrode signal may include converting the storage electrode signal from the low voltage into the reference voltage when polarity of the data voltage is positive at a time when a predetermined time is elapsed after application of the gate-off voltage and converting the storage electrode signal from the high voltage into the reference voltage when polarity of the data voltage is negative at a time when a predetermined time is elapsed after application of the gate-off voltage.

Alternatively, firstly converting a level of a storage electrode signal may include converting the storage electrode signal from the reference voltage into the high voltage when polarity of the data voltage is changed from negative polarity into positive polarity, and converting the storage electrode signal from the reference voltage into the low voltage when polarity of the data voltage is changed from positive polarity into negative polarity.

Alternatively, secondly converting the level of the storage electrode signal may include converting the storage electrode signal from the high voltage into the reference voltage when the polarity of the data voltage is positive at a time when a predetermined time is elapsed after application of the gate-off voltage and converting the storage electrode signal from the low voltage into the reference voltage when polarity of the data voltage is negative at a time when a predetermined time is elapsed after application of the gate-off voltage.

In other exemplary embodiments of the present invention, the liquid crystal display includes a plurality of gate lines receiving a gate-on voltage and a gate-off voltage, a plurality of data lines intersecting the gate lines and receiving a data voltage, and a plurality of pixels defined between the gate lines and the data lines, wherein a pixel voltage is changed at a time when a predetermined time elapses after the gate-off voltage is applied to the gate lines and before the gate-on voltage is applied to the gate lines.

The pixel voltage, at a time when the predetermined time elapses, may be different than the data voltage applied to the data lines and may be changed without employment of a frame memory.

The liquid crystal display may further include a plurality of storage electrodes receiving storage electrode signals, wherein each storage electrode signal changes a level thereof when the gate-on voltage is applied to the gate lines and changes a level thereof when the predetermined time elapses after the gate-off voltage is applied to the gate lines.

BRIEF DESCRIPTION OF THE DRAWINGS

The present invention will become more apparent by describing preferred embodiments thereof in detail with reference to the accompanying drawings, in which.

DETAILED DESCRIPTION OF THE INVENTION

Figure 1:
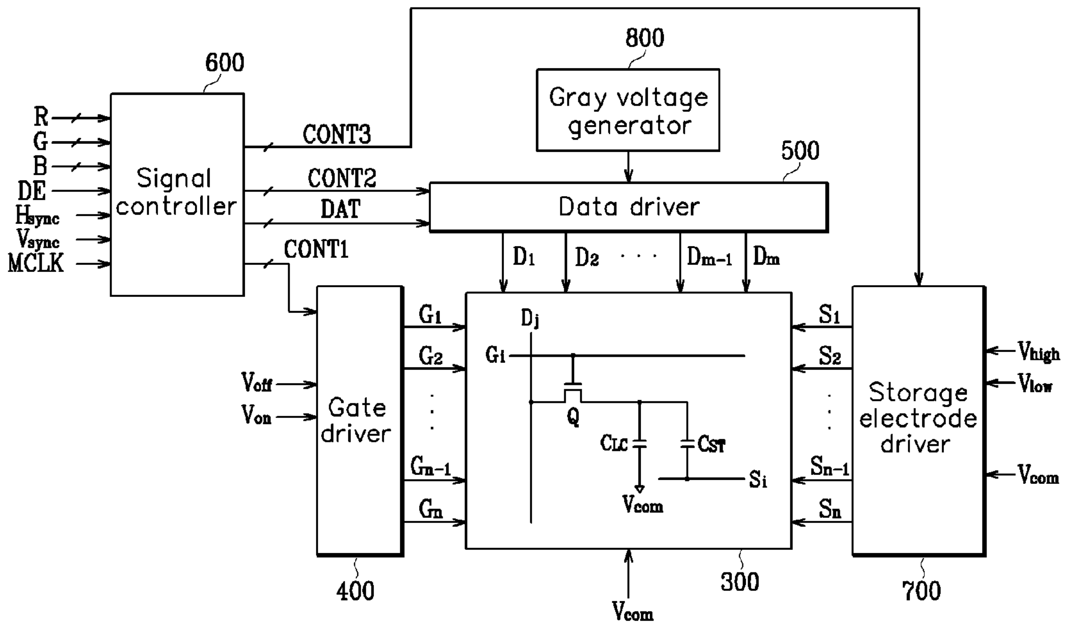
FIG. 1 is a block diagram of an exemplary embodiment of an LCD according to the present invention.

The invention will now be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like reference numerals refer to like elements throughout.

It will be understood that when an element is referred to as being "on" another element, it can be directly on the other element or intervening elements may be present there between. In contrast, when an element is referred to as being "directly on" another element, there are no intervening elements present. As used herein, the term "and/or" includes any and all combinations of one or more of the associated listed items.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed below could be termed a second element, component, region, layer or section without departing from the teachings of the present invention.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Spatially relative terms, such as "beneath", "below", "lower", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" the other elements or features. Thus, the exemplary term "below" can encompass both an orientation of above and below. The device may be otherwise oriented (rotated 90 degrees or at other orientations) and the spatially relative descriptors used herein interpreted accordingly.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

Embodiments of the present invention are described herein with reference to cross section illustrations that are schematic illustrations of idealized embodiments of the present invention. As such, variations from the shapes of the illustrations as a result, for example, of manufacturing techniques and/or tolerances, are to be expected. Thus, embodiments of the present invention should not be construed as limited to the particular shapes of regions illustrated herein but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present invention.

In the drawings, the thickness of layers and regions are exaggerated for clarity. Now, exemplary embodiments of LCDs and driving methods thereof according to the present invention will be described with reference to the drawings.

Figure 2:
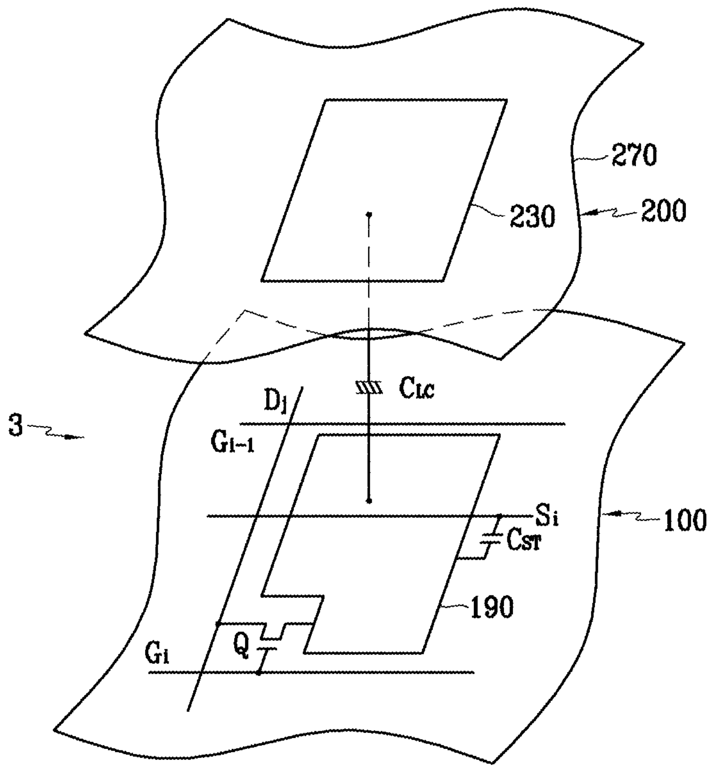
FIG. 2 is an equivalent circuit diagram of an exemplary pixel of an exemplary embodiment of an LCD according to the present invention.

FIG. 1 is a block diagram of an exemplary embodiment of an LCD according to the present invention, and FIG. 2 is an equivalent circuit diagram of a pixel of an exemplary embodiment of an LCD according to the present invention.

Referring to FIG. 1, an LCD includes an LC panel assembly 300, a gate driver 400, a data driver 500, and a storage electrode driver 700 connected thereto, a gray voltage generator 800 connected to the data driver 500, and a signal controller 600 controlling the above-described elements.

The LC panel assembly 300, as shown in FIG. 2, includes a lower panel 100 also termed a TFT array panel, an upper panel 200 also termed a common electrode panel, and a liquid crystal ("LC") layer 3 interposed there between. The lower panel 100 includes a plurality of display signal lines G1-Gn, D1-Dm, and S1-Sn and a plurality of pixels connected thereto and arranged substantially in a matrix in the circuital views shown in FIGS. 1 and 2.

The display signal lines G1-Gn, D1-Dm, and S1-Sn are provided on the lower panel 100 and include a plurality of gate lines G1-Gn transmitting gate signals (called scanning signals), a plurality of storage electrode lines S1-Sn transmitting storage electrode signals, and a plurality of data lines D1-Dm transmitting data signals. The gate lines G1-Gn extend substantially in a row direction, a first direction, and are substantially parallel to each other, while the data lines D1-Dm extend substantially in a column direction, a second direction, and are substantially parallel to each other. The first direction is substantially parallel to the second direction. A pair of adjacent gate lines and a pair of adjacent data lines define a pixel area there between. The storage electrode lines S1-Sn substantially extend in the row or column direction. In the illustrated embodiments, the storage electrode lines S1-Sn extend substantially parallel to the gate lines G1-Gn.

Each pixel includes a switching element Q connected to the display signal lines G1-Gn, D1-Dm, and S1-Sn, and an LC capacitor $C_{LC}$ and a storage capacitor $C_{ST}$ that are connected to the switching element Q. In some alternative embodiments of LCDs, the storage capacitor $C_{ST}$ may be omitted if unnecessary, however it is included in the embodiments described herein.

The switching element Q such as a thin film transistor ("TFT") is provided on the lower panel 100, and has three terminals including a control terminal such as a gate electrode connected to one of the gate lines G1-Gn, an input terminal such as a source electrode connected to one of the data lines D1-Dm, and an output terminal such as a drain electrode connected to the LC capacitor $C_{LC}$ and the storage capacitor $C_{ST}$.

The LC capacitor $C_{LC}$ includes a pixel electrode 190 on the lower panel 100, a common electrode 270 on the upper panel 200, and the LC layer 3 as a dielectric between the electrodes 190 and 270. The pixel electrode 190 is connected to the switching element Q, and the common electrode 270 covers the entire surface, or substantially the entire surface, of the upper panel 100 and is supplied with a common voltage Vcom. Alternatively, both the pixel electrode 190 and the common electrode 270, which have shapes of bars or stripes, are provided on the lower panel 100.

The storage capacitor $C_{ST}$ is an auxiliary capacitor for the LC capacitor $C_{LC}$. The storage capacitor $C_{ST}$ includes the pixel electrode 190 and the storage electrode lines S1-Sn, which are provided on the lower panel 100, and are provided in an overlapping configuration with the pixel electrode 190 via an insulator. The storage electrode lines S1-Sn are supplied with storage electrode voltages $V_{s_1}$-$V_{s_n}$, as will be further described below.

For color display, each pixel uniquely represents one of three colors such as red, green, and blue colors or sequentially represents the three colors in time, thereby obtaining a desired color. The three colors may be red, green, and blue colors, primary colors, or other others not described herein. FIG. 2 shows an example in which each pixel includes a color filter 230 representing one of the three colors in an area of the upper panel 200, such that each color filter 230 faces a corresponding pixel electrode 190. Alternatively, the color filter 230 is provided on or under the pixel electrode 190 on the lower panel 100.

A pair of polarizers (not shown) for polarizing the light are attached on the outer surfaces of the panels 100 and 200 of the LC panel assembly 300. The first and second polarizers adjust a transmission direction of light externally provided in the lower panel 100 and the upper panel 200, respectively, in accordance with an aligned direction of the LC layer 3. The first and second polarizers have first and second polarized axes thereof substantially perpendicular to each other, respectively. Alternatively, one of the polarizers may be omitted when the LCD is a reflective LCD.

The gray voltage generator 800 generates two sets of a plurality of gray voltages related to the transmittance of the pixels. The gray voltages in one set have a positive polarity with respect to the common voltage Vcom, while those in the other set have a negative polarity with respect to the common voltage Vcom.

The gate driver 400 is connected to the gate lines G1-Gn of the LC panel assembly 300 and synthesizes the gate-on voltage Von and the gate off voltage Voff to generate gate signals for application to the gate lines G1-Gn.

The storage electrode driver 700 is connected to the storage electrode lines S1-Sn of the LC panel assembly 300 and synthesizes an externally applied common voltage Vcom, a high voltage $V_{high}$, and a low voltage $V_{low}$ for application to the storage electrode lines S1-Sn. Alternatively, the externally applied common voltage Vcom may instead be a reference voltage other than the common voltage Vcom.

The data driver 500 is connected to the data lines D1-Dm of the LC panel assembly 300 and applies data voltages selected from the gray voltages supplied from the gray voltage generator 800 to the data lines D1-Dm.

According to another embodiment of the present invention, the integrated circuit ("IC") chips of the gate driver 400, the storage electrode driver 700, or the data driver 500 are mounted on the lower panel 100. According to yet another embodiment, at least one among the gate driver 400, the storage electrode driver 700, and the data driver 500 is incorporated along with other elements into the lower panel 100 such that the manufacture of layers of the lower panel 100 includes the simultaneous integration of at least one of the gate driver 400, the storage electrode driver 700, and the data driver 500 within the lower panel 100.

The signal controller 600 controls the gate driver 400, the storage electrode driver 700, and the data driver 500.

Now, a structure of the LCD will be further described with reference to FIGS. 3 to 8.

Figure 3:
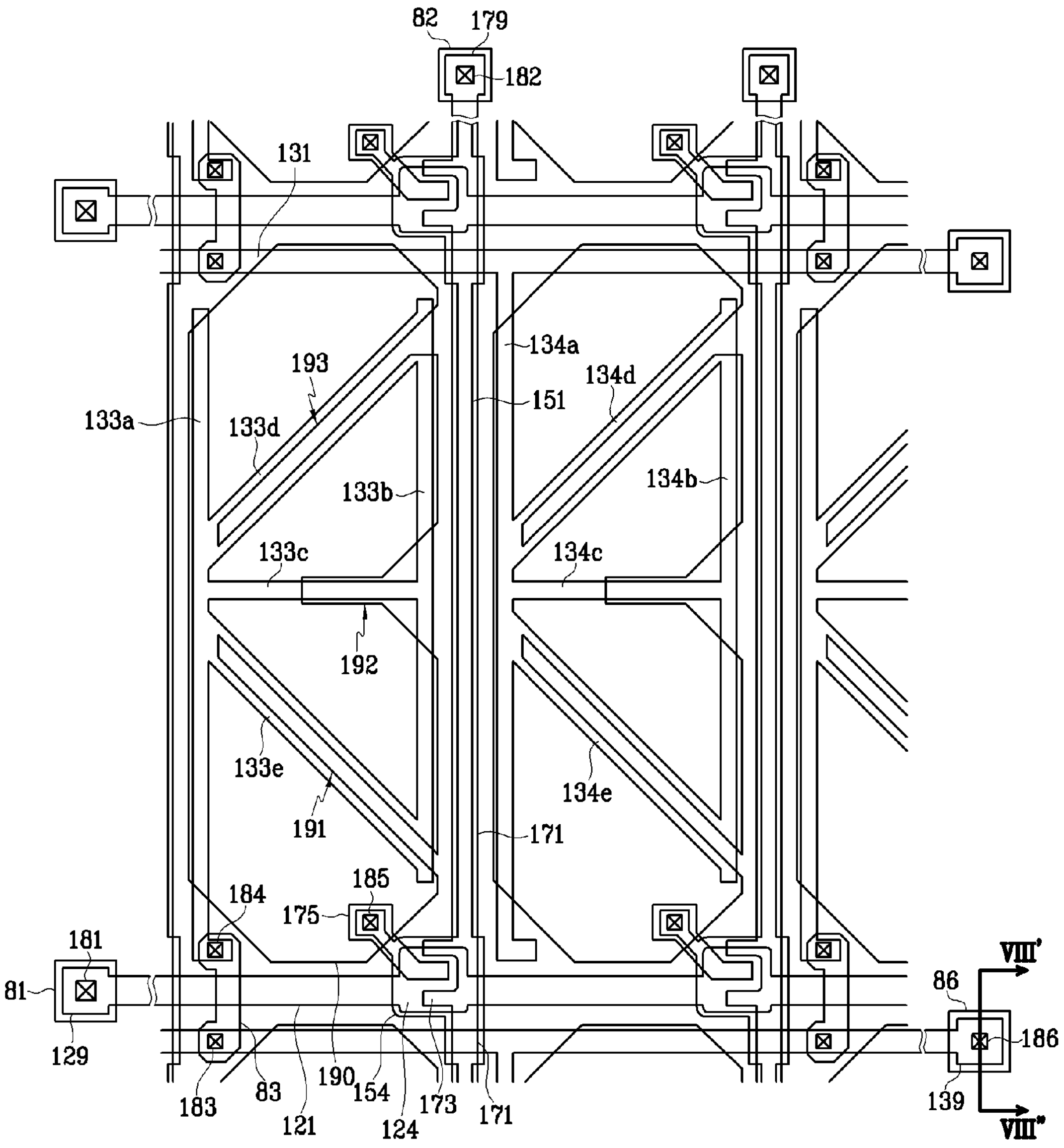
FIG. 3 is a layout view of an exemplary TFT array panel for an exemplary embodiment of an LCD according to the present invention.
Figure 4:
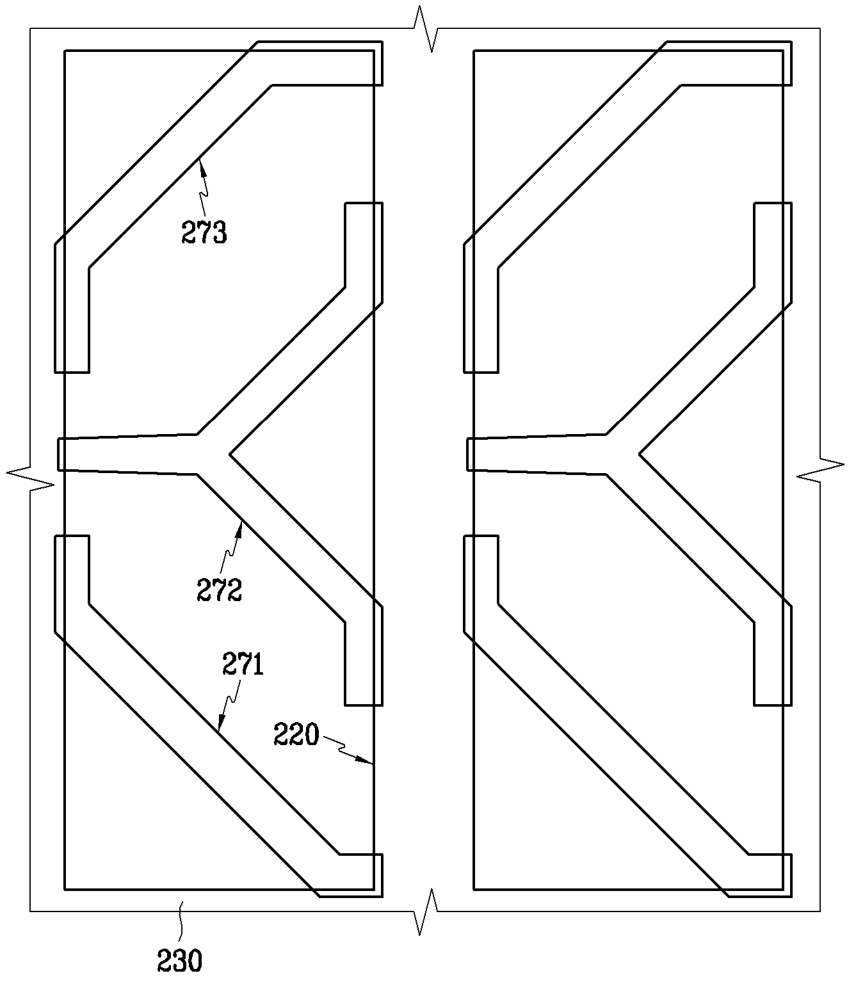
FIG. 4 is a layout view of an exemplary common electrode panel for an exemplary embodiment of an LCD according to the present invention.
Figure 5:
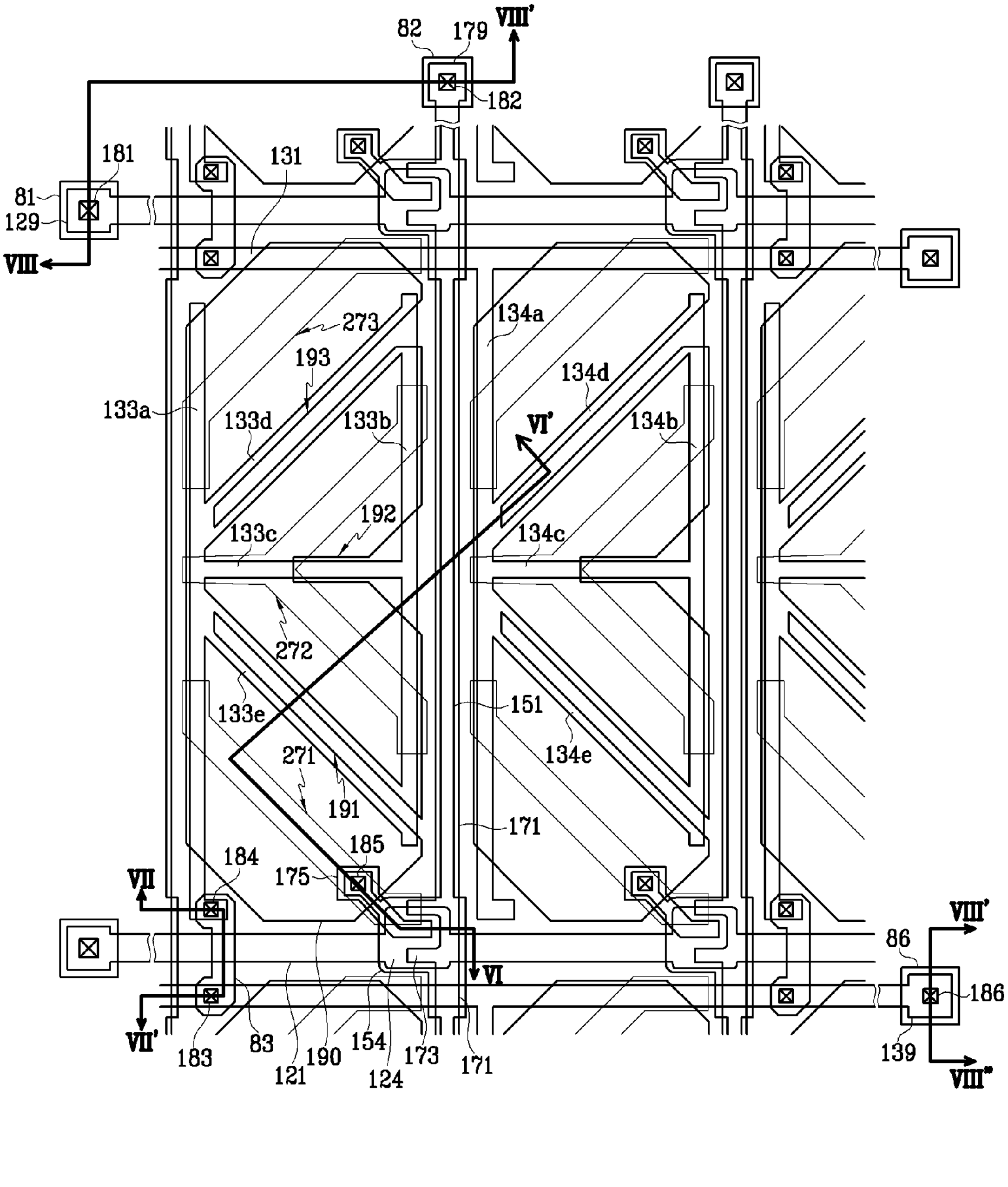
FIG. 5 is a layout view of an exemplary embodiment of an LCD including the exemplary TFT array panel shown in FIG. 3 and the exemplary common electrode panel shown in FIG. 4.
Figure 6:
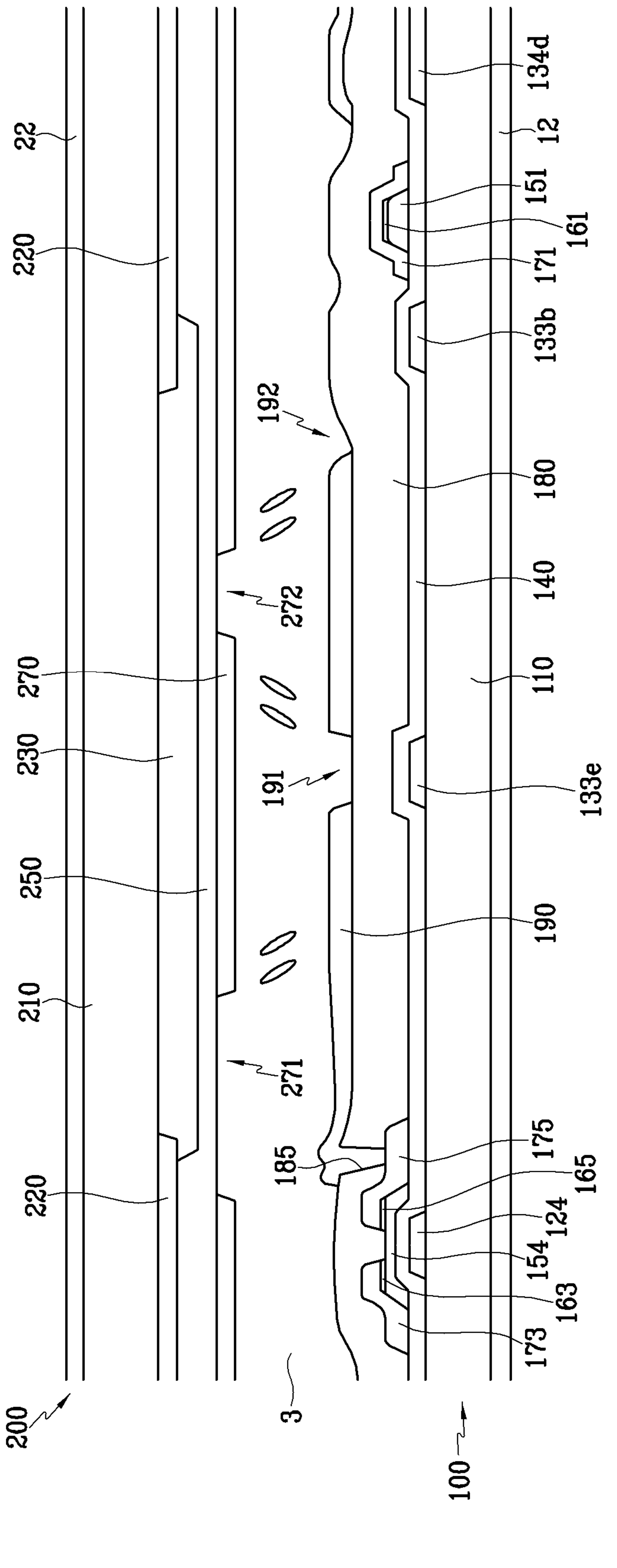
FIGS. 6 to 8 are sectional views of the exemplary embodiment of an LCD shown in FIG. 5 taken along lines VI-VI', VII-VII', VIII-VIII', and VIII'-VIII'' respectively.
Figure 7:
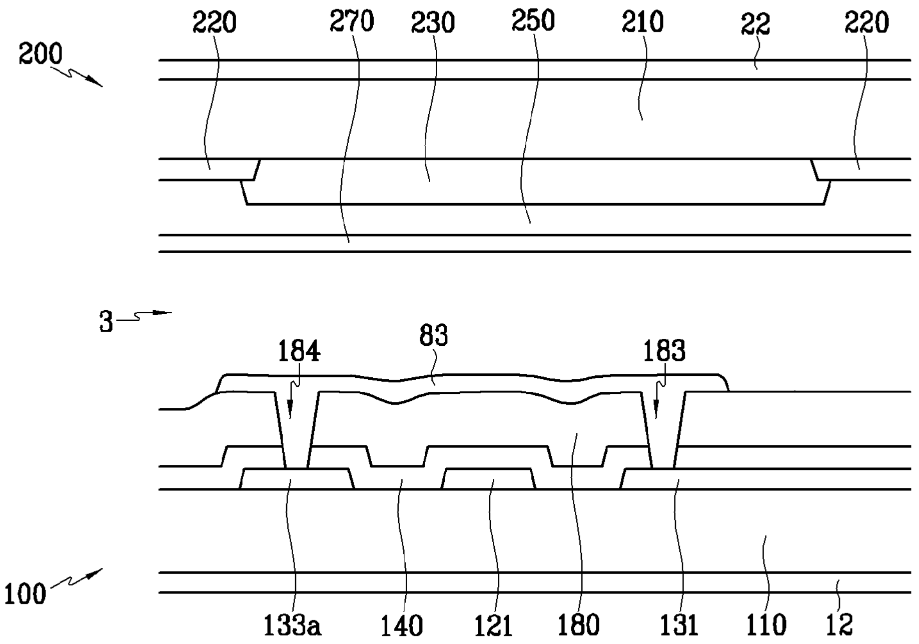
Figure 8:
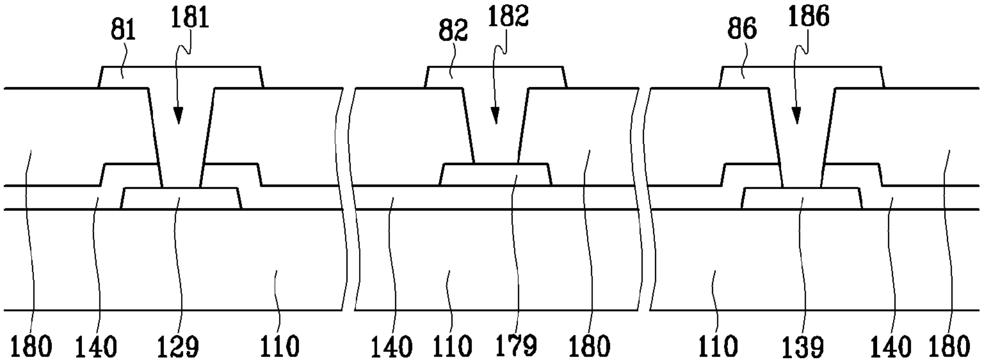

FIG. 3 is a layout view of an exemplary TFT array panel for an exemplary embodiment of an LCD according to the present invention. FIG. 4 is a layout view of an exemplary common electrode panel for an exemplary embodiment of an LCD according to the present invention, and FIG. 5 is a layout view of an exemplary embodiment of an LCD including the exemplary TFT array panel shown in FIG. 3 and the exemplary common electrode panel shown in FIG. 4. FIGS. 6 to 8 are sectional views of the exemplary embodiments of the LCD shown in FIG. 5 taken along lines VI-VI', VII-VII', VIII-VIII', and VHF-VHF, respectively.

The LCD of FIGS. 3 to 8 includes a TFT array panel 100, a common electrode panel 200 facing the TFT array panel 100, and an LC layer 3 interposed between the panels 100 and 200 and having liquid crystal molecules arranged substantially perpendicular to surfaces of the panels 100 and 200.

The TFT array panel 100 will now be further described with reference to FIGS. 3 to 5.

A plurality of gate lines 121 and a plurality of storage electrode lines 131 are formed on an insulating substrate 110 such as, but not limited to, transparent glass.

The gate lines 121 extend substantially in a transverse direction, a first direction, and are separated from each other, are substantially parallel to each other, and transmit gate signals. Each gate line 121 includes a plurality of projections forming a plurality of gate electrodes 124, and an end portion 129 having a large area for contact with another layer or an external driving circuit. The gate lines 121 may extend to be connected to a driving circuit, such as gate driver 400, that may be integrated on the insulating substrate 110 or that may be mounted elsewhere relative to the TFT array panel 100.

Each storage electrode line 131 extends substantially in the transverse direction, the first direction so as to be substantially parallel to the gate lines 121, and includes a plurality of sets of branches 133*a*-133*e* and 134*a*-134*e* and an end portion 139 having a large area for contact with another layer or an external driving circuit, such as storage electrode driver 700.

A set of branches 133*a*-133*e* and 134*a*-134*e* includes first storage electrodes 133*a*-133*e* and second storage electrodes 134*a*-134*e*. The first storage electrodes 133*a*-133*e* and the second storage electrodes 134*a*-134*e* are in turn disposed by a unit of a pixel. That is, the first storage electrodes 133*a*-133*e* are disposed in one pixel, while the second storage electrodes 134*a*-134*e* are disposed in an adjacent pixel. The first storage electrodes 133*a*-133*e* alternate with the second storage electrodes 134*a*-134*e* within the row of pixels.

The storage electrodes 133*a* and 133*b* extend in a longitudinal direction, the second direction, at left and right edges of the corresponding pixel, respectively, corresponding to first and second opposing sides of the pixel. The storage electrode 133*c* extends in the transverse direction, the first direction, and connects the storage electrode 133*a* to the storage electrode 133*b*. The storage electrode 133*c* may be positioned within a central portion of the pixel. The storage electrodes 133*d* and 133*e* extend in an oblique direction and connect the storage electrode 133*a* to the storage electrode 133*b*. The storage electrodes 133*d* and 133*e* may each include a first end extending from the storage electrode 133*a* adjacent the storage electrode 133*c* and a second end connecting to the storage electrode 133*b* at first and second ends of the storage electrode 133*b*.

Likewise, the storage electrodes 134*a* and 134*b* extend in a longitudinal direction, the second direction, at left and right edges of the corresponding pixel, respectively. The storage electrode 134*c* extends in the transverse direction, the first direction, and connects the storage electrode 134*a* to the storage electrode 134*b*. The storage electrode 134*c* may be positioned within a central portion of the pixel. The storage electrodes 134*d* and 134*e* extend in the oblique direction and connect the storage electrode 134*a* to the storage electrode 134*b*. The storage electrodes 134*d* and 134*e* may each include a first end extending from the storage electrode 134*a* adjacent the storage electrode 134*c* and a second end connecting to the storage electrode 134*b* at first and second ends of the storage electrode 134*b*.

The storage electrode 133*a* has upper and lower free end portions and the lower free end portion has a projection. The projection may extend substantially perpendicular to the longitudinal direction of the storage electrode 133*a*. The storage electrode 134*a* has a free end portion and a fixed end portion that is connected to the storage electrode line 131. The free end portion has a projection.

The storage electrodes 133*c* and 134*c* extend approximately along an imaginary centerline between two adjacent gate lines 121. Each storage electrode line 131 is supplied with a storage electrode signal, such as from the storage electrode driver 700.

The gate lines 121 and the storage electrode lines 131 are preferably made of an aluminum Al-containing metal such as Al and an Al alloy, a silver Ag-containing metal such as Ag and an Ag alloy, a copper Cu-containing metal such as Cu and a Cu alloy, a molybdenum Mo-containing metal such as Mo and a Mo alloy, chromium Cr, titanium Ti, or tantalum Ta. The gate lines 121 and the storage electrode lines 131 may have a multi-layered structure including two films having different physical characteristics. In such a multi-layered structure, one of the two films is preferably made of a low resistivity metal including an Al-containing metal for reducing signal delay or voltage drop in the gate lines 121 and the storage electrode lines 131, while the other film is preferably made of a material such as Cr, Mo, a Mo alloy, Ta, or Ti, which has good physical, chemical, and electrical contact characteristics with other materials such as indium tin oxide ("ITO") or indium zinc oxide ("IZO"). Acceptable examples of the combination of the two films include, but are not limited to, a lower Cr film and an upper Al (Al—Nd alloy) film and a lower Al (Al alloy) film and an upper Mo film. However, while particular embodiments have been described herein, the gate lines 121 and the storage electrode lines 131 may be made of various metals and conductive materials.

In addition, the lateral sides of the gate line 121 and the storage electrode lines 131 are tapered, and the inclination angle of the lateral sides with respect to a surface of the insulating substrate 110 ranges from about 20 to about 80 degrees.

A gate insulating layer 140 preferably made of silicon nitride (SiNx) is formed on the gate lines 121 and the storage electrode lines 131, as well as on other exposed portions of the insulating substrate 110. Other materials for the gate insulating layer 140 would also be within the scope of these embodiments.

A plurality of semiconductor stripes 151 preferably made of hydrogenated amorphous silicon ("a-Si") are formed on the gate insulating layer 140. Each semiconductor stripe 151 extends substantially in a longitudinal direction, the second direction, and has a plurality of projections 154 branched out toward the gate electrodes 124.

As shown in FIG. 6, a plurality of ohmic contact stripes and islands 161 and 165 preferably made of silicide or n+ hydrogenated a-Si heavily doped with an n-type impurity are formed on the semiconductor stripes 151. Each ohmic contact stripe 161 has a plurality of projections 163, and the projections 163 and the ohmic contact islands 165 are located in pairs on the projections 154 of the semiconductor stripes 151.

The lateral sides of the semiconductor stripes 151 and the ohmic contacts 161 and 165 are tapered, and the inclination angles thereof are preferably in a range between about 30 to about 80 degrees with respect to a surface of the insulating substrate 110.

A plurality of data lines 171 and a plurality of drain electrodes 175 are formed on the ohmic contacts 161 and 165 and the gate insulating layer 140.

The data lines 171 for transmitting data voltages extend substantially in the longitudinal direction, the second direction, and intersect the gate lines 121 and the storage electrode lines 131, although insulated therefrom by the gate insulating layer 140. Each data line 171 is parallel to and disposed between the storage electrode line 133*b* and the storage electrode line 134*a* or between the storage electrode line 134*b* and the storage electrode line 133*a*, which are disposed adjacent to each data line 171, and includes an expansion 179 having a larger area for contact with another layer or an external device such as the data driver 500. A plurality of branches of each data line 171, which project toward the drain electrodes 175, form a plurality of source electrodes 173. Each drain electrode 175 includes an end portion having a large area for contact with another layer, such as the pixel electrode 190 as will be further described below, and another end portion disposed on a gate electrode 124 and partly enclosed by a source electrode 173.

A gate electrode 124, a source electrode 173, and a drain electrode 175 along with a projection 154 of a semiconductor stripe 151 form a TFT having a channel formed in the projection 154 disposed between the source electrode 173 and the drain electrode 175 and between the ohmic contact island 165 and projection 163 of the ohmic contact stripe 161.

The data lines 171 and the drain electrodes 175 are preferably made of a refractory metal such as Cr, Mo, Ti, Ta, or alloys thereof. However, they may also have a multilayered structure including a low-resistivity film (not shown) and a good-contact film (not shown). Examples of an appropriate combination include a lower Mo film, an intermediate Al film, and an upper Mo film, and a lower Ti film (or TiNx), an intermediate Al film (or an Al—Nd alloy), and an upper Ti film (or TiNx) as well as the above-described combinations of a lower Cr film and an upper Al—Nd alloy film and a lower Al film and an upper Mo film. However, while particular embodiments have been described herein, the data lines 171 and the drain electrodes 175 may be made of various metals and conductive materials.

Like the gate lines 121 and the storage electrode lines 131, the data lines 171 and the drain electrodes 175 have tapered lateral sides, and the inclination angles thereof range about 30 to about 80 degrees with respect to the surface of the insulating substrate 110.

The ohmic contacts 161 and 165 are interposed only between the underlying semiconductor stripes 151 and the overlying data lines 171 and the overlying drain electrodes 175 thereon, and reduce the contact resistance there between. The semiconductor stripes 151 include a plurality of exposed portions, which are not covered with the data lines 171 and the drain electrodes 175, such as portions located between the source electrodes 173 and the drain electrodes 175 and between the ohmic contact islands 165 and projections 163 of the ohmic contact stripes 161.

A passivation layer 180 is formed on the data lines 171, the drain electrodes 175, and the exposed portions of the semiconductor stripes 151. As illustrated, the passivation layer 180 may be further formed on exposed portions of the gate insulating layer 140.

The passivation layer 180 is preferably made of a photosensitive organic material having a good flatness characteristic, a low dielectric insulating material such as a-Si:C:O and a-Si:O:F formed by plasma-enhanced chemical vapor deposition ("PECVD"), or an inorganic material such as silicon nitride and silicon oxide. The passivation layer 180 may have a double-layered structure including a lower inorganic film and an upper organic film, to use the good characteristics of the organic film and prevent the semiconductors 151*a* and 151*b* from being exposed.

The passivation layer 180 has a plurality of contact holes 182 and 185 exposing the end portions 179 of the data lines 171 and the drain electrodes 175, respectively. The passivation layer 180 and the gate insulating layer 140 have a plurality of contact holes 181, 186, 184, and 183 exposing the end portions 129 of the gate lines 121, the end portions 139 of the storage electrode lines 131, the projections of the free end portions of the storage electrodes 133*a*, and portions of the storage electrode lines 131 adjacent to the projections of the free end portions of the storage electrodes 133*a*, respectively. The contact holes 181-186 may have a polygonal shape or a circular shape and may have tapered lateral sides.

A plurality of pixel electrodes 190, a plurality of contact assistants 81, 82, and 86, and a plurality of overpasses 83, which are preferably made of a transparent conductor such as, but not limited to, ITO or IZO, are formed on the passivation layer 180.

The pixel electrodes 190 are physically and electrically connected to the drain electrodes 175 through the contact holes 185 such that the pixel electrodes 190 receive the data voltages from the drain electrodes 175.

The pixel electrodes 190 supplied with the data voltages generate electric fields in cooperation with the common electrode 270 of the common electrode layer 200, which determine the orientations of LC molecules in the LC layer 3.

A pixel electrode 190 and the common electrode 270 form a liquid crystal capacitor $C_{LC}$, which stores applied voltages after turn-off of the TFT. A storage capacitor $C_{ST}$ is connected in parallel to the liquid crystal capacitor $C_{LC}$, and provides for enhancing the voltage storing capacity. The storage capacitors $C_{ST}$ are implemented by overlapping the pixel electrodes 190 over the storage electrode lines 131 including the storage electrodes 133*a*-133*e*/134*a*-134*e*.

Each pixel electrode 190 is chamfered at its four corners, and the chamfered edges of the pixel electrode 190 make an angle of about 45 degrees with the gate lines 121 and the data lines 171.

In the illustrated embodiment, each pixel electrode 190 has a lower cutout 191, a center cutout 192, and an upper cutout 193, which partition the pixel electrode 190 into a plurality of partitions or portions. The cutouts 191-193 substantially have an inversion symmetry with respect to the storage electrodes 133*c*/134*c*.

The lower and the upper cutouts 191 and 193 obliquely extend from a right edge (second side) of the pixel electrode 190 near an upper right corner approximately to a center of a left edge (first side) of the pixel electrode 190, and are disposed at lower and upper halves of the pixel electrode 190, respectively, which can be divided by the storage electrode 133*c*/134*c*. The lower and the upper cutouts 191 and 193 make an angle of about 45 degrees with respect to the gate lines 121, and they extend substantially perpendicular to each other.

The center cutout 192 extends along the storage electrode 133*c*/134*c* and has an inlet from the right edge (second side) of the pixel electrode 190, which has a pair of inclined edges substantially parallel to the lower cutout 191 and the upper cutout 193, respectively.

Accordingly, the lower half of the pixel electrode 190 is partitioned into two lower partitions or portions by the lower cutout 191, and the upper half of the pixel electrode 190 is partitioned into two upper partitions or portions by the upper cutout 193. While a particular embodiment has been illustrated and described, the number of partitions or the number of cutouts may be varied depending on the design factors such as the size of pixels, the ratio of the transverse edges and the longitudinal edges of the pixel electrodes, the type and characteristics of the LC layer 3, and so on. Therefore, such variations would be within the scope of these embodiments.

The contact assistants 81, 82, and 86 are connected to the end portions 129 of the gate lines 121, the end portions 179 of the data lines 171, and the end portions 139 of the storage electrode lines 131 through the contact holes 181, 182, and 186 respectively. As shown in FIG. 8, the contact assistants 81, 82, and 86 protect the end portions 129, 179, and 139 and complement the adhesion of the end portions 129, 179, and 139 and external devices, where the external devices may include the gate driver 400, the data driver 500, and the storage electrode driver 700, respectively.

The overpasses 83 cross over the gate lines 121 and are connected to the exposed projection of the fixed end portions of the storage electrodes 133*a* and the exposed portions of the storage electrode lines 131 through the contact holes 184 and 183, respectively, which are disposed opposite each other with respect to the gate lines 121. That is, each overpass 83 spans between two adjacent pixels arranged in the second direction, such that each pixel includes a portion of one overpass 83 connected to the storage electrode lie 131 within an upper half of the pixel and a portion of another overpass 83 connected to the storage electrode 133*a* or 134*a* within a lower half of the pixel.

A description of the exemplary common electrode panel 200 follows with reference to FIGS. 4 to 7.

A light blocking member 220, also termed a black matrix, for preventing light leakage is formed on an insulating substrate 210 such as, but not limited to, transparent glass. The light blocking member 220 may include a plurality of openings that face the pixel electrodes 190 and may have substantially the same planar shape as the pixel electrodes 190. Otherwise, the light blocking member 220 may include linear portions corresponding to the data lines 171 and other portions corresponding to the TFTs. However, various shapes of the light blocking member 220 for preventing light leakage near the pixel electrodes 190 and the TFTs are within the scope of these embodiments.

A plurality of color filters 230 are formed on the substrate 210, and the color filters 230 are disposed substantially in the areas enclosed by the light blocking member 220. The color filters 230 may extend substantially along the longitudinal direction along the pixel electrodes 190. Each color filter 230 may represent one of the colors such as red, green, and blue colors.

An overcoat 250 for preventing the color filters 230 from being exposed and for providing a flat surface is formed on the color filters 230 and the light blocking member 220.

A common electrode 270 preferably made of transparent conductive material such as, but not limited to, ITO and IZO is formed on the overcoat 250.

The common electrode 270 has a plurality of sets of cutouts 271-273.

A set of cutouts 271-273 face a pixel electrode 190 and include a lower cutout 271, a center cutout 272, and an upper cutout 273. Each of the cutouts 271-273 is disposed in locations on the common electrode 270 corresponding to locations between adjacent cutouts 191-193 of the pixel electrode 190 or between a cutout 191 or 193 and a chamfered edge of the pixel electrode 190.

Each of the lower and upper cutouts 271 and 273 includes an oblique portion extending approximately from a location on the common electrode 270 corresponding to a left edge (first side) of the pixel electrode 190 approximately to locations on the common electrode 270 corresponding to a lower or upper edge (third and fourth sides) of the pixel electrode 190, and transverse and longitudinal portions extending from respective ends of the oblique portions of the lower and upper cutouts 271 and 273 along locations on the common electrode 270 corresponding to edges of the pixel electrode 190, overlapping the edges of the pixel electrode 190, and making obtuse angles with the oblique portions.

The center cutout 272 includes a central transverse portion extending approximately from a location on the common electrode 270 corresponding to the left edge (first side) of the pixel electrode 190 along the storage electrode 133*c*/134*c*, a pair of oblique portions extending from an end of the central transverse portion approximately to a location on the common electrode 270 corresponding to a right edge (second side) of the pixel electrode 190 and making obtuse angles with the central transverse portion, and a pair of terminal longitudinal portions extending from the ends of the respective oblique portions along locations on the common electrode 270 corresponding to the right edge (second side) of the pixel electrode 190, overlapping the right edge of the pixel electrode 190, and making obtuse angles with the respective oblique portions.

While a particular embodiment has been illustrated and described, the number of the cutouts 271-273 may be varied depending on the design factors, and the light blocking member 220 may also overlap the cutouts 271-273 to block the light leakage through the cutouts 271-273. Thus, such variations would also be within the scope of these embodiments.

Alignment layers (not shown) that may be homeotropic may be coated on inner surfaces of the panels 100 and 200, and polarizers 12 and 22 are provided on outer surfaces of the panels 100 and 200, disposed on the insulating substrates 110 and 210, respectively, such that their polarization axes may be crossed and one of the transmissive axes may be parallel to the gate lines 121. One of the polarizers 12 and 22 may be omitted when the LCD is a reflective LCD.

The LCD may further include at least one retardation film (not shown) for compensating the retardation of the LC layer 3.

It is preferable that the LC layer 3 has negative dielectric anisotropy, and it is subjected to a vertical alignment ("VA") mode in which the LC molecules in the LC layer 3 are aligned such that their long axes are substantially vertical to the surfaces of the panels 100 and 200 in the absence of an electric field.

The cutouts 191-193 and 271-273 control the tilt directions of the LC molecules in the LC layer 3, as will be further described below.

The LC molecules in the LC layer 3 in areas defined by adjacent cutouts 191-193 and 271-272 or by the inclined edges of the cutouts 271 and 273 and the pixel electrodes 190 are tilted in a direction perpendicular to a longitudinal direction of the cutouts 191-193 and 271-273. Two long edges of each area are substantially parallel to each other and make an angle of about 45 degrees with the gate lines 121.

At least one of the cutouts 191-193 and 271-273 may be substituted with protrusions (not shown) or depressions (not shown).

As previously described, the shapes and the arrangements of the cutouts 191-193 and 271-273 may be modified and such modifications are within the scope of these embodiments.

Now, the operation of the LCD will be described with reference to FIG. 9 along with FIG. 1.

Figure 9:
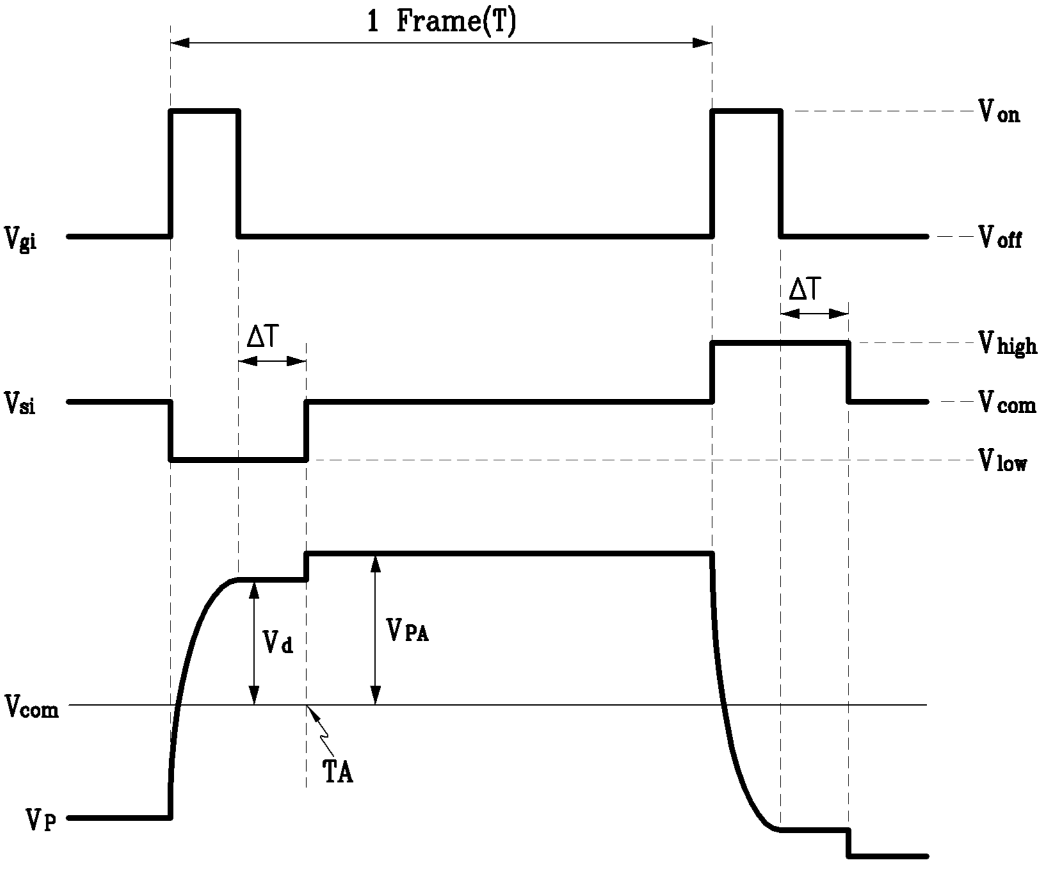
FIG. 9 illustrates exemplary waveforms of various signals for driving an exemplary embodiment of an LCD according to the present invention.

FIG. 9 illustrates exemplary waveforms of various signals for driving an exemplary embodiment of an LCD according to the present invention.

The signal controller 600, as shown in FIG. 1, is supplied with RGB image signals R, G, and B and input control signals controlling the display thereof such as a vertical synchronization signal Vsync, a horizontal synchronization signal Hsync, a main clock signal MCLK, and a data enable signal DE, provided from an external graphics controller (not shown). After generating gate control signals CONT1, data control signals CONT2, and storage electrode control signals CONT3 and processing the image signals R, G, and B to be suitable for the operation of the LC panel assembly 300 on the basis of the input control signals, the signal controller 600 provides the gate control signals CONT1 to the gate driver 400, the processed image signals DAT and the data control signals CONT2 to the data driver 500, and the storage electrode control signals CONT3 to the storage electrode driver 700.

The gate control signals CONT1 include a scanning start signal STV for instructing the start of scanning and at least a clock signal for controlling the output time of the gate-on voltage Von. The gate control signals CONT1 may further include an output enable signal OE for defining the duration of the gate-on voltage Von.

The data control signals CONT2 include a horizontal synchronization start signal STH for informing of start of data transmission for a group of pixels, a load signal LOAD for instructing the application of the data voltages to the data lines D1-Dm, and a data clock signal HCLK. The data control signals CONT2 may further include an inversion signal RVS for reversing the polarity of the data voltages (with respect to the common voltage Vcom).

The storage electrode control signals CONT3 include at least one clock signal for controlling output of the scanning start signal STV, and the high voltage $V_{high}$ and the low voltage $V_{low}$.

In response to the data control signals CONT2 from the signal controller 600, the data driver 500 receives a packet of the image data DAT for the group of pixels from the signal controller 600, converts the image data DAT into analog data voltages Vd selected from the gray voltages supplied from the gray voltage generator 800, and applies the data voltages Vd to the data lines D1-Dm.

The gate driver 400 applies the gate-on voltage Von to the gate line G1-Gn in response to the gate control signals CONT1 from the signal controller 600, thereby turning on the switching elements Q connected thereto. The data voltages Vd applied to the data lines D1-Dm are supplied to the pixels through the activated switching elements Q. For example, when a gate electrode 124 is supplied with a gate-on voltage Von, the source electrode 173 receives the data voltage Vd and supplies the data voltage Vd to the drain electrode 175 and the connected pixel electrode 190. Thus, the data voltage Vd corresponds to the pixel voltage $V_p$.

The storage electrode driver 700 selects one voltage among three voltages of a storage electrode signal Vsi, where the three voltages include a common voltage Vcom, the high voltage $V_{high}$, and the low voltage $V_{low}$. The selection is made based on the storage electrode control signals CONT3 from the signal controller 600, and the selected voltage is applied to the storage electrode lines S1-Sn. With reference to FIG. 9, when the polarity of the data voltage Vd is changed from negative polarity (−) into positive polarity (+), the storage electrode signal Vsi within one frame is changed into the low voltage $V_{low}$ and when the polarity of the data voltage Vd is changed from the positive polarity (+) into the negative polarity (+), the storage electrode signal Vsi within a subsequent frame is changed into the high voltage $V_{high}$.

The difference between the data voltage Vd and the common voltage Vcom is represented as a voltage across the LC capacitor $C_{LC}$, which is referred to as a pixel voltage Vp. The LC molecules in the LC capacitor $C_{LC}$ have orientations depending on the magnitude of the pixel voltage Vp, and the molecular orientations determine the polarization of light passing through the LC layer 3. The polarizer(s) 12, or 12 and 22, converts the light polarization into light transmittance.

The level change of the storage electrode signal Vsi described above is a previous operation for raising or dropping a level of the pixel voltage Vp. The occurrence of the level change of the storage electrode signal Vsi to the low voltage Vlow or the high voltage Vhigh coincides with the application of the gate on voltage Von.

By a unit of the horizontal period, the operation of the data driver 500, the gate driver 400, and the storage electrode driver 700 is repeated.

During each frame, the storage electrode driver 700 selects the common voltage Vcom, or other reference voltage, instead of the low voltage $V_{low}$ or high voltage $V_{high}$ to output as the storage electrode signal Vsi at a time TA when a predetermined time Δ T elapses after the switching element Q is turned off by application of the gate-off voltage Voff. In other words, during one frame, after the application of the gate off voltage Voff to the data lines, a predetermined time Δ T elapses and then the storage electrode driver 700 applies the common voltage Vcom to the storage electrode lines as the storage electrode signal Vsi. Thus, during one frame, the storage electrode signal Vsi will be either the low voltage Vlow or the high voltage Vhigh for the duration of the gate on voltage Von and the predetermined time Δ T, and then the storage electrode signal Vsi will be the common voltage Vcom for the remainder of the frame. Then, during a subsequent frame, the storage electrode signal Vsi will be the other of the low voltage Vlow or the high voltage Vhigh for the duration of a subsequent gate on voltage Von and the predetermined time Δ T, and then the storage electrode signal Vsi will again be the common voltage Vcom for the remainder of the subsequent frame.

In the embodiment shown in FIG. 9, when polarity of the data voltage Vd is changed from the negative polarity (−) into the positive polarity (+), the storage electrode signal Vsi is changed from the low voltage $V_{low}$ into the common voltage Vcom in one frame, and when the polarity of the data voltage Vd is changed from the positive polarity (+) into the negative polarity (−), the storage electrode signal Vsi is changed from the high voltage $V_{high}$ into the common voltage Vcom in a subsequent frame.

In a state in which the switching element Q is turned off, following the predetermined time Δ T after the gate off voltage Voff is applied, when a level of the storage electrode voltage Vsi is raised such as from the low voltage Vlow to the common voltage Vcom, a level of the pixel voltage Vp is also raised by a bias applied to the pixel electrode 190, and when a level of the storage electrode voltage Vsi is lowered such as from the high voltage Vhigh to the common voltage Vcom, a level of the pixel voltage Vp is also lowered. A voltage variation $\Delta V_A$ with respect to a variation $\Delta V_s$ of the storage electrode voltage Vsi is represented as shown by Equation 1.

$$\Delta V_A = \frac{C_{ST}}{C_{ST} + C_{gs} + C_{LC}} \times \Delta V_S \quad \text{[Equation 1]}$$

The pixel voltage $V_{PA}$ at a time TA, which occurs after the predetermined time Δ T elapses, is obtained as shown by Equation 2

$$V_{PA} = \pm V_d + \frac{C_{ST}}{C_{ST} + C_{gs} + C_{LC}} \times \Delta V_S \quad \text{[Equation 2]}$$

Here, Vd is a data voltage, $C_{ST}$ is capacitance of a storage capacitor, $C_{gs}$ is capacitance of a parasitic capacitor between a gate terminal and a source terminal, such as a gate electrode and a source electrode, of a switching element Q, $C_{LC}$ is capacitance of a liquid crystal capacitor, and ΔVs is a variation amount of a storage electrode signal Vsi.

As described above, since the level of the pixel voltage Vp is raised or lowered by varying the storage electrode signal Vsi with respect to the common voltage Vcom, the pixel voltage Vp decreased by passage of time after application of the data voltage Vd is compensated. Thus, the response speed of the LC molecules within the LC layer 3 is improved.

The predetermined time Δ T may be defined within a time T of one frame. For example, in a state in which a frame frequency is 60 Hz, when the predetermined time Δ T is 0.5 T, the effect generated in a case that the frame frequency is 120 Hz is obtained and the predetermined time Δ T is 0.67 T, the effect generated in a case that the frame frequency is 90 Hz is obtained. That is, in a graph of luminance with respect to time of an LCD of the prior art, an inflection point occurs every frame, but though the frame frequency is 60 Hz, the occurrence position of the inflection point is similar to that of the 90 Hz or 120 Hz such that the response speed of the LC molecules is improved.

By repeating this procedure by a unit of the horizontal period, all gate lines G1-Gn are sequentially supplied with the gate-on voltage Von during a frame, thereby applying the data voltages Vd to all pixels via the data lines D1-Dm and sequentially applying the storage electrode signals $V_{S_1}$-$V_{S_r}$ to all the storage electrode lines S1-Sn. When the next frame starts after finishing one frame, the inversion control signal RVS applied to the data driver 500 is controlled such that the polarity of the data voltages Vd is reversed (which is referred to as "frame inversion"). The inversion control signal RVS may also be controlled such that the polarity of the data voltages Vd flowing in a data line in one frame are reversed (for example, line inversion and dot inversion), or the polarity of the data voltages Vd in one packet are reversed (for example, column inversion and dot inversion).

The storage electrode signals $V_{S_1}$-$V_{S_n}$ are changed from the high voltage $V_{high}$ or the low voltage $V_{low}$ into the common voltage Vcom within each frame based on the polarity of the data voltages Vd by units of a row and a frame.

In an alternative embodiment, the storage electrode signal $V_{S_1}$-$V_{S_n}$ may include another voltage with a predetermined level instead of the common voltage Vcom, such as a reference voltage, which is lower than the high voltage $V_{high}$ and is higher than the low voltage $V_{low}$.

An arrangement of the exemplary storage electrode lines for the dot inversion in the exemplary embodiment of the LCD according to the present invention will be described with reference to FIGS. 10 and 11 along with FIG. 9.

Figure 10:
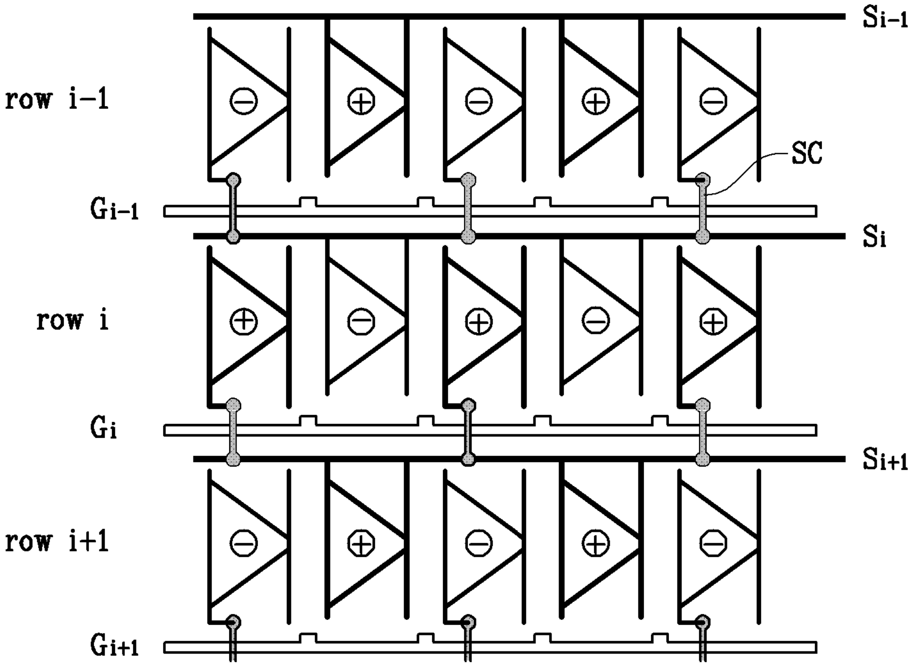
FIGS. 10 and 11 are schematic views of an exemplary storage electrode line of an exemplary embodiment of an LCD according to the present invention.
Figure 11:
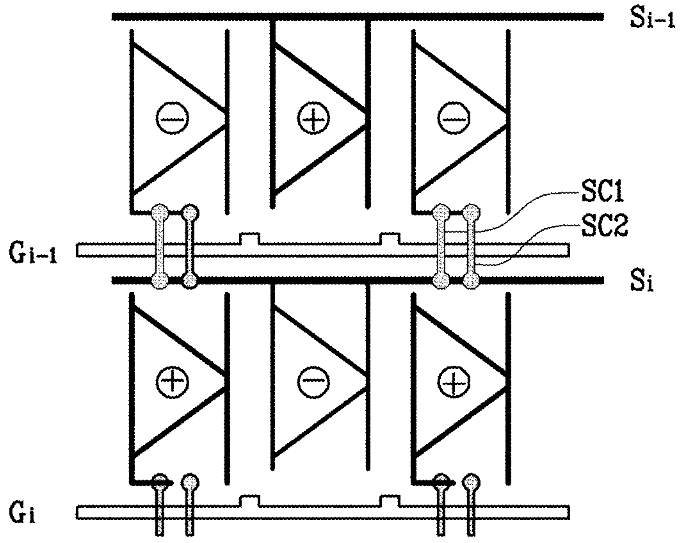

FIGS. 10 and 11 are schematic views of an exemplary storage electrode line of an exemplary embodiment of an LCD according to the present invention.

As shown in FIG. 10, each storage electrode line S1-Sn extends in a transverse direction, the first direction, and is connected to a storage electrode of a pixel adjacent to the storage electrode lines S1-Sn. As previously described with respect to FIGS. 3 and 5, the storage electrode of each pixel includes two longitudinal portions which extend in a longitudinal direction on left and right edges, (first and second sides of each pixel) respectively, and two oblique portions connecting the two longitudinal portions. The storage electrodes of the even_th pixels of the i_th row are connected to the storage electrode line Si of the i_th row, and the storage electrodes of the odd_th pixels of the i_th row are connected to the storage electrode line $S_{i+1}$ of the (i+1)_th row through a connection bridge SC, corresponding to the overpass 83 of FIGS. 3 and 5. Because the connection bridge SC is insulated from the gate lines, as shown in FIG. 7, for example, the storage electrodes of the i_th row and the storage electrode line $S_{i+1}$ of the (i+1)_th row are connected to each other without contact with the gate line Gi extending in the transverse direction between the storage electrodes and the storage electrode lines $S_{i+1}$.

As described above, the storage electrodes of the even_th pixels of the i_th row and the storage electrodes of the odd_th pixels of the (i−1)_th row, that is, the previous row, are connected to the storage electrode line Si of the i_th row. When an inversion type is dot inversion, the polarity of the data voltage of the even_th pixel of the i_th row is equal to the polarity of the data voltage of the odd_th pixel of the (i−1)_th row. Thus, the storage electrode signal Vsi shown in FIG. 9 is applied to the storage electrodes of the pixels that are supplied with the data voltage Vd of the same polarity such that the level of the pixel voltages Vp of the pixels is increased or decreased in dot inversion.

Since the storage electrode signal Vsi may be delayed due to a contact resistance of the connection bridge SC, as shown in FIG. 11, the number of connection bridges SC may be plural, for example, two. Thus, the contact resistance value due to the two connection bridges SC1 and SC2 may be decreased by half.

Now, arrangement of the storage electrode lines for the dot inversion in another exemplary embodiment of an LCD according to the present invention will be described with reference to FIGS. 12 and 13 along with FIG. 9.

Figure 12:
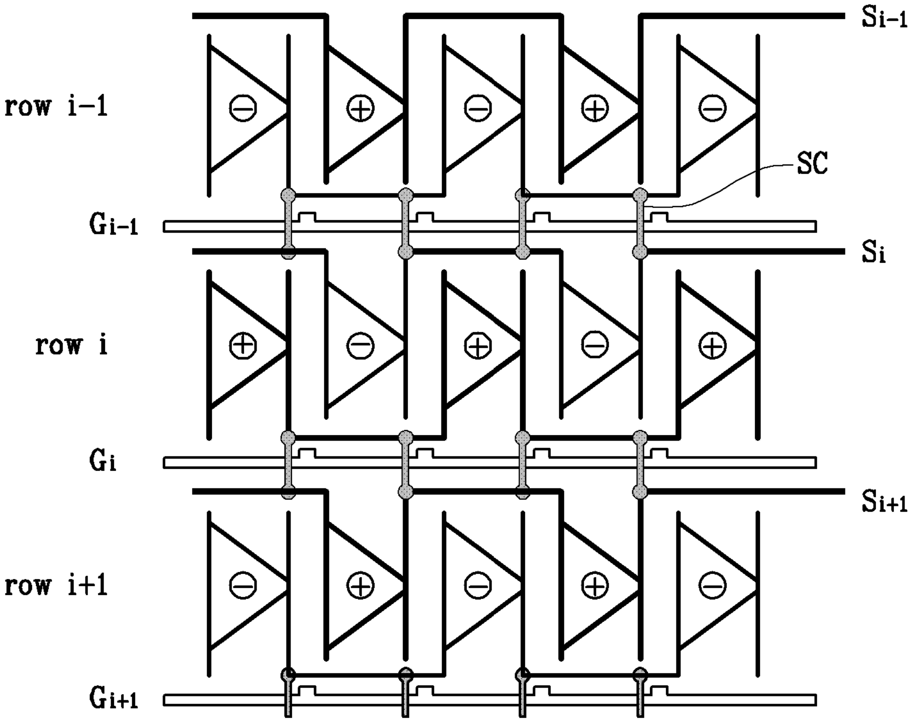
FIGS. 12 and 13 are schematic views of an exemplary storage electrode line of another exemplary embodiment of an LCD according to the present invention.
Figure 13:
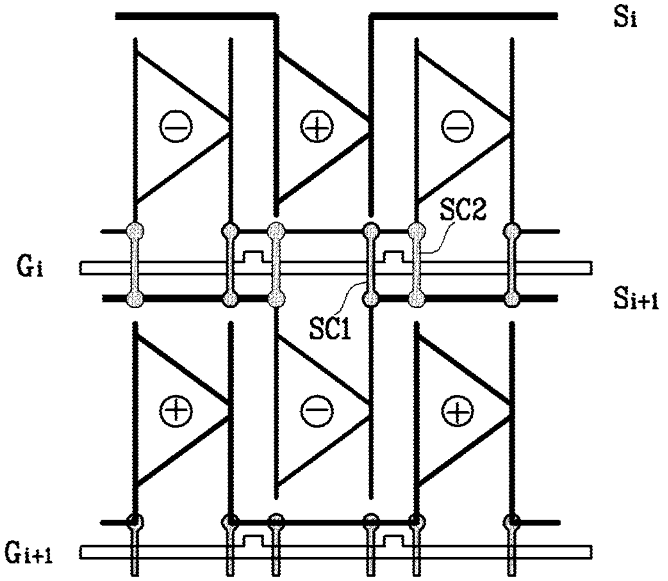

FIGS. 12 and 13 are schematic views of an exemplary storage electrode line of another exemplary embodiment of an LCD according to the present invention.

As shown in FIG. 12, each storage electrode line S1-Sn includes a plurality of transverse portions extending in a transverse direction, first direction, parallel to and adjacent the gate lines G1-Gn. Each transverse portion is disposed near the corresponding gate line G1-Gn and is in turn disposed by a unit of a pixel on upper or lower parts of the gate line G1-Gn (the transverse portion disposed on the upper of the gate line G1-Gn is called “an upper transverse portion” and the transverse portion disposed on the lower of the gate line G1-Gn is called “a lower transverse portion”). Each storage electrode line includes alternatingly arranged upper transverse portions and lower transverse portions. In the dot inversion example provided herein, the arrangement alternates with each pixel, however alternate arrangements are within the scope of these embodiments.

End portions of each transverse portion are connected to storage electrodes of pixels adjacent thereto, respectively. A storage electrode of each pixel includes two longitudinal portions which extend in a longitudinal direction on left and right edges (first and second sides), respectively, and two oblique portions connecting the two longitudinal portions.

The upper transverse portions of the storage electrode line Si are connected to storage electrodes of the odd_th pixels of the (i−1)_th row, and the lower transverse portions of the storage electrode line Si are connected to storage electrodes of the even_th pixels of the i_th row. As illustrated, the upper transverse portions of the storage electrode lines are connected to the lower ends of the longitudinal portions of the storage electrodes and the lower transverse portions are connected to the upper ends of the longitudinal portions of the storage electrodes.

The upper transverse portions and the lower transverse portions are connected to each other through a connection bridge SC without contact with the gate line Gi between them, respectively.

Like the embodiment described above, the storage electrodes of the even_th pixels of the i_th row and the storage electrodes of the odd_th pixels of the (i−1)_th row, that is, the previous row, are connected to the storage electrode line Si of the i_th row. When an inversion type is dot inversion, the polarity of the data voltage of the even_th pixel of the i_th row is equal to the polarity of the data voltage of the odd_th pixel of the (i−1)_th row. Thus, the storage electrode signal Vsi shown in FIG. 9 is applied to the storage electrodes of the pixels that are supplied with the data voltage Vd of the same polarity such that the level of the pixel voltages Vp of the pixels is increased or decreased in dot inversion.

In addition, as shown in FIG. 13, the number of connection bridges may be plural, for example, two, such that the contact resistance value due to the two connection bridges SC1 and SC2 may be decreased by half.

While the inversion type for the embodiments of FIGS. 10-11 and FIGS. 12-13 has been described as dot inversion, it should be understood that other inversion types would also be within the scope of these embodiments.

Now, an exemplary driving method of another exemplary embodiment of the LCD according to the present invention will be described with reference to FIG. 14.

Figure 14:
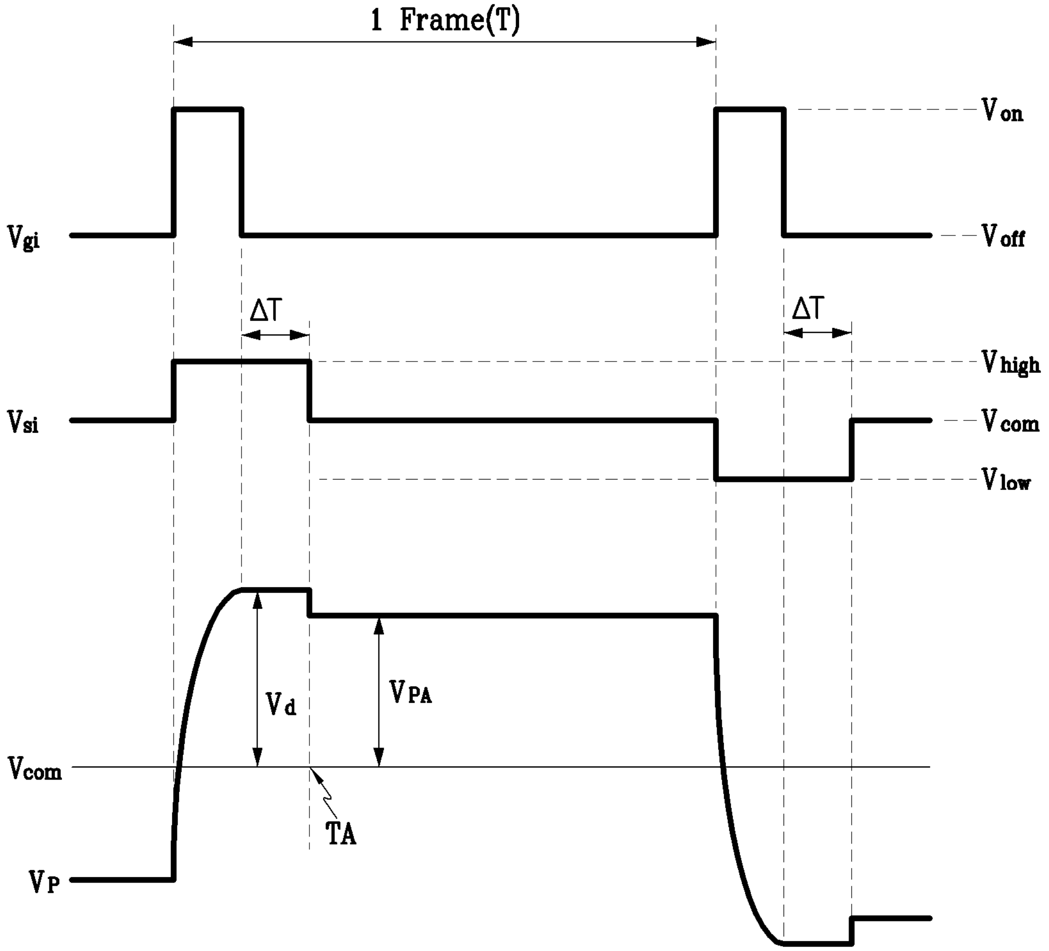
FIG. 14 illustrates exemplary waveforms of various signals for driving another exemplary embodiment of an LCD according to the present invention.

FIG. 14 illustrates exemplary waveforms of various signals for driving another exemplary embodiment of an LCD according to the present invention.

As shown in FIG. 14, a storage electrode signal Vsi of the LCD has a phase inverted to that of the storage electrode signal Vsi shown in FIG. 9.

That is, in a state in which the gate driver 400 applies a gate-on voltage Von to the gate lines G1-Gn, when the polarity of the data voltage Vd is changed from negative polarity (−) into positive polarity (+), the storage electrode driver 700 changes the storage electrode signal Vsi from the common voltage Vcom into the high voltage $V_{high}$ to output to the storage electrode lines S1-Sn in one frame, and when polarity of the data voltage Vd is changed from the positive polarity (+) into the negative polarity (−), the storage electrode driver 700 changes the storage electrode signal Vsi from the common voltage Vcom into the low voltage $V_{low}$ to output the storage electrode lines S1-Sn in a subsequent frame.

At a time TA when a predetermined time Δ T elapses after the switching element Q is turned off by application of the gate-off voltage Voff to the gate lines, the storage electrode driver 700 changes the storage electrode signal Vsi from the low voltage $V_{low}$ or high voltage $V_{high}$ into the common voltage Vcom. In this embodiment, when polarity of the data voltage Vd is changed from the negative polarity (−) into the positive polarity (+), the storage electrode signal Vsi is changed from the high voltage $V_{high}$ into the common voltage Vcom, and when the polarity of the data voltage Vd is changed from the positive polarity (+) into the negative polarity (−), the storage electrode signal Vsi is changed from the low voltage $V_{low}$ into the common voltage Vcom. Thus, a level of the pixel voltage Vp falls when the polarity of the data voltage Vd is the positive polarity (+) and a level of the pixel voltage Vp is raised when the polarity of the data voltage Vd is the negative polarity (−).

When the above described driving method is adapted, the data voltage Vd has a magnitude higher than that of a voltage corresponding to a target luminance. The driving method of FIG. 14 may be employed in LCDs having storage electrode lines arranged in either of the embodiments shown in FIGS. 10-13, and may also be employed in any inversion type.

In a PVA mode LCD of a normally black type, when driving the LCD using the driving method shown in FIG. 9, capacitance of the LC capacitor $C_{LC}$ become large in high grays, and thereby the variation amount ΔVs of [Equation 1] becomes larger in low grays and not in high grays such that luminance of a black color may be increased. However, when driving the PVA mode LCD using the driving method shown in FIG. 14, the pixel voltage Vp is compensated to decrease it such that the luminance of the black color is not increased.

The driving methods according to embodiments of the present invention may be adapted to an LCD of an multi-domain vertical alignment ("MVA") mode, an super-patterned vertical alignment ("SPVA") mode, or a super vertical alignment ("SVA") mode, and may also be adapted to an LCD of a twisted nematic ("TN") mode or an optically compensated birefringence ("OCB") mode, which are normally white types.

Thus, according to the present invention, without a frame memory, a level of the pixel voltage Vp charged in full gray is raised or lowered such that a response speed of LC molecules in the LC layer 3 is improved and a decrease of contrast ratio due to a luminance increase is prevented.

While the present invention has been described in detail with reference to the preferred embodiments, it is to be understood that the invention is not limited to the disclosed embodiments, but, on the contrary, is intended to cover various modifications and equivalent arrangements included within the spirit and scope of the appended claims.

What is claimed is:

1. A driving method of a liquid crystal display, the method comprising:

applying a gate-on voltage to a gate line connected to a gate electrode of a switching element of a pixel every frame, wherein an output terminal of the switching element is connected to a first terminal of a storage capacitor of the pixel;

converting a level of a storage electrode signal from a reference voltage into a first voltage at a rising edge of the gate-on voltage in a first frame; and converting the level of the storage electrode signal from the reference voltage into a second voltage, which is different from the reference voltage and the first voltage, at a rising edge of the gate-on voltage in a second frame different from the first frame, wherein the storage electrode signal is applied to a storage electrode line connected to a second terminal of the storage capacitor of the pixel, wherein the storage electrode signal comprising three different voltage levels of the reference voltage, the first voltage and the second voltage, the reference voltage, the first voltage and the second voltage being different from each other.

2. The method of claim 1, further comprising:

applying a gate-off voltage; and secondly converting the level of the storage electrode signal back into the reference voltage after the application of the gate-off voltage.

3. The method of claim 2, further comprising:

maintaining the secondly converted level of the storage electrode signal until a next frame begins.

4. The method of claim 3, wherein the secondly converting of the level of the storage electrode signal into the reference voltage is performed prior to an end of a frame associated with the application of the gate-on voltage.

5. The method of claim 4, further comprising applying a data voltage when the gate-on voltage is applied, wherein a polarity of the data voltage is positive in the second frame, and the polarity of the data voltage is negative in the first frame.

6. The method of claim 5, wherein the polarity of the data voltage is inverted every at least one frame.

7. The method of claim 6, wherein the first voltage is greater than the reference voltage and the second voltage is lower than the reference voltage.

8. The method of claim 6, wherein the first voltage is lower than the reference voltage and the second voltage is greater than the reference voltage.

9. The method of claim 2, wherein the secondly converting of the level of the storage electrode signal into the reference voltage is performed prior to an end of a frame associated with the application of the gate-on voltage.

10. The method of claim 9, further comprising applying a data voltage when the gate-on voltage is applied, wherein a polarity of the data voltage is positive in the second frame, and the polarity of the data voltage is negative in the first frame.

11. The method of claim 10, wherein the first voltage is greater than the reference voltage and the second voltage is lower than the reference voltage.

12. The method of claim 10, wherein the first voltage is lower than the reference voltage and the second voltage is greater than the reference voltage.

13. The method of claim 2, further comprising applying a data voltage when the gate-on voltage is applied, wherein a polarity of the data voltage is positive in the second frame, and the polarity of the data voltage is negative in the first frame.

14. The method of claim 13, wherein the polarity of the data voltage is inverted every at least one frame.

15. The method of claim 14, wherein the first voltage is greater than the reference voltage and the second voltage is lower than the reference voltage.

16. The method of claim 14, wherein the first voltage is lower than the reference voltage and the second voltage is greater than the reference voltage.

17. The method of claim 1, further comprising applying a data voltage when the gate-on voltage is applied, wherein a polarity of the data voltage is positive in the second frame, and the polarity of the data voltage is negative in the first frame.

18. The method of claim 17, wherein the polarity of the data voltage is inverted every at least one frame.

19. The method of claim 17, wherein the first voltage is greater than the reference voltage and the second voltage is lower than the reference voltage.

20. The method of claim 17, wherein the first voltage is lower than the reference voltage and the second voltage is greater than the reference voltage.

* * * * *